(12) United States Patent
Yang et al.

(10) Patent No.: US 12,743,764 B2
(45) Date of Patent: Sep. 22, 2026

(54) APPARATUS AND METHOD FOR INSPECTING ASSEMBLY HOLE OF VEHICLE

(71) Applicants: Hyundai Motor Company, Seoul (KR); Kia Corporation, Seoul (KR)

(72) Inventors: Sung Chul Yang, Pyeongtaek (KR); Min Ook Park, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 612 days.

(21) Appl. No.: 18/103,872

(22) Filed: Jan. 31, 2023

(65) Prior Publication Data

US 2024/0020818 A1 Jan. 18, 2024

(30) Foreign Application Priority Data

Jul. 12, 2022 (KR) ........................ 10-2022-0085617

(51) Int. Cl.
*G06T 7/00* (2017.01)
*G06T 1/00* (2006.01)
*G06T 7/50* (2017.01)

(52) U.S. Cl.
CPC .......... *G06T 7/0006* (2013.01); *G06T 1/0014* (2013.01); *G06T 7/50* (2017.01); *G06T 2207/20081* (2013.01); *G06T 2207/30108* (2013.01)

(58) Field of Classification Search
CPC ....... G06T 7/0006; G06T 1/0014; G06T 7/50; G06T 2207/20081; G06T 2207/30108; G06T 2207/20084; G06T 7/0004; G01N 21/8851; G01N 2021/8887; G01N 2021/8854; G01N 2021/8883; G01N 2021/9518; G01N 2201/103; G01N 2201/1296; G06V 10/765; G06V 10/82; G06V 2201/08; B62D 65/005; G06N 3/08
See application file for complete search history.

(56) References Cited

U.S. PATENT DOCUMENTS 3,685,126 A * 8/1972 Kane ........................ B25D 1/16 29/271
2015/0019014 A1 1/2015 Kim
2015/0343640 A1* 12/2015 Shi ........................ B25J 9/1687 382/153
2019/0392595 A1* 12/2019 Uhlenbrock .............. G06T 3/14
2022/0067901 A1* 3/2022 Takahashi ............ G06K 15/027
(Continued)

FOREIGN PATENT DOCUMENTS

CN 111862196 A * 10/2020 ........... G06T 1/0014
JP H10-197231 A 7/1998
KR 1999-0033327 A 5/1999
(Continued)

*Primary Examiner* — Oneal R Mistry
*Assistant Examiner* — Justin Philip Cascais
(74) *Attorney, Agent, or Firm* — Fox Rothschild LLP

(57) ABSTRACT

An apparatus and a method for inspecting an assembly hole of a vehicle are provided. The apparatus may comprise a sensor device configured to obtain an image of a part-fastening area and a processor configured to detect an assembly hole of a vehicle body in the image and configured to perform artificial intelligence (AI) learning of a shape of the assembly hole to determine whether the part-fastening area is defective.

8 Claims, 14 Drawing Sheets

(56) References Cited

U.S. PATENT DOCUMENTS

| | | | | |
|---|---|---|---|---|
| 2022/0244194 | A1* | 8/2022 | Perron | G01N 21/8851 |
| 2022/0405905 | A1* | 12/2022 | Doi | G06T 7/001 |

FOREIGN PATENT DOCUMENTS

| | | | |
|---|---|---|---|
| KR | 100576127 | B1 | 5/2006 |
| KR | 101479857 | B1 | 1/2015 |
| KR | 10-2021-0102566 | A | 8/2021 |
| KR | 10-2022-0045447 | A | 4/2022 |

* cited by examiner

APPARATUS AND METHOD FOR INSPECTING ASSEMBLY HOLE OF VEHICLE

CROSS-REFERENCE TO RELATED APPLICATION(S)

This application claims, under 35 U.S.C. § 119(a), the benefit of Korean Patent Application No. 10-2022-0085617, filed in the Korean Intellectual Property Office on Jul. 12, 2022, the disclosure of which is incorporated herein by reference in its entirety.

BACKGROUND

Technical Field

Embodiments of the present disclosure relate to an apparatus and a method for inspecting an assembly hole of a vehicle, and, more particularly, to technologies for reducing an assembly hole inspection time.

Background

The processes of producing vehicles may comprise a press process, a body assembly process, a painting process, an outfitting assembly process, an inspection process, and the like. Furthermore, a powertrain comprising an engine and a transmission may be manufactured through a casting process, a forging process, a sintering process, a heat treatment process, a machining process, an assembly process, and the like.

The body assembly process may comprise a procedure of completing one body assembly by combining many parts such as a roof panel and a side assembly or an under body through welding with various robot welding guns or the like. The body assembly process may comprise a process of manufacturing a vehicle body. The vehicle body may comprise an under body, such as an engine room, a front floor, a rear floor, a side dash, and a side sill, and a main body, such as a side body, a roof rail, a roof, partial chef, an apron, and a side wheel.

The body assembly process may comprise a process of fixing various vehicle parts to the vehicle body and may be coupled to the vehicle body using a fastener such as a bolt.

It is difficult for the assembly hole formed in the vehicle body to couple the vehicle body to parts due to molding defects or distortions. Thus, the assembly hole of the vehicle body may be visually inspected to proceed with inspecting the assembly hole of the vehicle body in the body assembly process. Because the visual inspection takes a lot of time, it is common to sample and inspect a portion of the vehicle body. However, the case where the assembly hole is defective in the vehicle body which is not inspected occurs. When the sampling rate increases to prevent it, the body assembly process takes too long.

SUMMARY

The present disclosure has been made to solve at least the above-mentioned problems occurring in the existing technologies while advantages achieved by the existing technologies are maintained intact.

According to an object of the present disclosure, an apparatus and a method are provided for inspecting an assembly hole of a vehicle to considerably reduce an assembly hole inspection time of a vehicle body.

According to an object of the present disclosure, an apparatus and a method are provided for inspecting an assembly hole of a vehicle to increase the performance of detecting a defect in assembly hole while reducing an inspection time.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for inspecting an assembly hole of a vehicle may comprise a sensor device that obtains an image of a part-fastening area and a processor that detects an assembly hole of a vehicle body in the image and performs artificial intelligence (AI) learning of a shape of the assembly hole to determine whether the part-fastening area is defective.

According to an exemplary embodiment, the sensor device may comprise a robotic arm that moves based on a robot off-line teaching program (OLP) and a camera coupled to the robotic arm and configured to obtain the image.

According to an exemplary embodiment, the processor may be configured to perform AI learning of the image to detect a hole and may determine whether the hole corresponds to the assembly hole.

According to an exemplary embodiment, the processor may be configured to detect an area where a first hole formed in a first panel of the part-fastening area and a second hole formed in a second panel of the part-fastening area overlap with each other.

According to an exemplary embodiment, the processor may be configured to determine whether the first hole or the second hole corresponds to a circular hole used to mount a chassis.

According to an exemplary embodiment, the processor may be configured to determine whether the part-fastening area is defective, wherein the part-fastening area may be defective when the area where the first hole and the second hole overlaps with each other is greater than or equal to a threshold size.

According to an exemplary embodiment, the processor may be configured to determine whether the first hole or the second hole is a square hole used to assemble a front glass.

According to an exemplary embodiment, the processor may be configured to determine whether the part-fastening area is defective, wherein the part-fastening area may be defective when a length of any segment connecting both sides facing each other in the square hole is less than a predetermined threshold length.

According to an exemplary embodiment, the processor may be configured to determine whether the first hole or the second hole is a notch hole used to mount a rear quarter glass.

According to an exemplary embodiment, the processor may be configured to determine whether the part-fastening area is defective, wherein the part-fastening area may be defective when a gap where the notch hole and a panel overlap with each other is greater than or equal to a predetermined threshold.

According to an object of the present disclosure, a method is provided for inspecting an assembly hole of a vehicle may comprise obtaining an image of a part-fastening area, detecting an assembly hole in the image, and performing artificial intelligence (AI) learning of a shape of the assembly hole to determine whether the part-fastening area is defective.

According to an exemplary embodiment, the obtaining the image of the part-fastening area may comprise controlling a position of a camera obtaining the image using a robot off-line teaching program (OLP).

According to an exemplary embodiment, the detecting of the assembly hole in the image may comprise performing AI learning of the image to detect a hole and determining whether the hole corresponds to the assembly hole, based on the learned result.

According to an exemplary embodiment, the detecting the assembly hole in the image may further comprise detecting an area where a first hole formed in a first panel of the part-fastening area and a second hole formed in a second panel of the part-fastening area overlap with each other.

According to an exemplary embodiment, the determining whether the hole corresponds to the assembly hole, based on the learned result, may comprise determining whether the first hole or the second hole is a circular hole.

According to an exemplary embodiment, the determining whether the part-fastening area is defective may comprise determining whether the part-fastening area is defective, wherein the part-fastening area may be defective when the area where the first hole and the second hole overlaps with each other is greater than or equal to a threshold size.

According to an exemplary embodiment, the determining whether the hole corresponds to the assembly hole, based on the learned result, may comprise determining whether the first hole or the second hole is a square hole.

According to an exemplary embodiment, the determining whether the part-fastening area is defective may comprise determining whether the part-fastening area is defective, wherein the part-fastening area may be defective when a length of any segment connecting both sides facing each other in the square hole is less than a predetermined threshold length.

According to an exemplary embodiment, the determining whether the hole corresponds to the assembly hole, based on the learned result, may comprise determining whether the first hole or the second hole is a notch hole.

According to an exemplary embodiment, the determining whether the part-fastening area is defective may comprise determining whether the part-fastening area is defective, wherein the part-fastening area may be defective when a gap where the notch hole and a panel overlap with each other is greater than or equal to a predetermined threshold.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
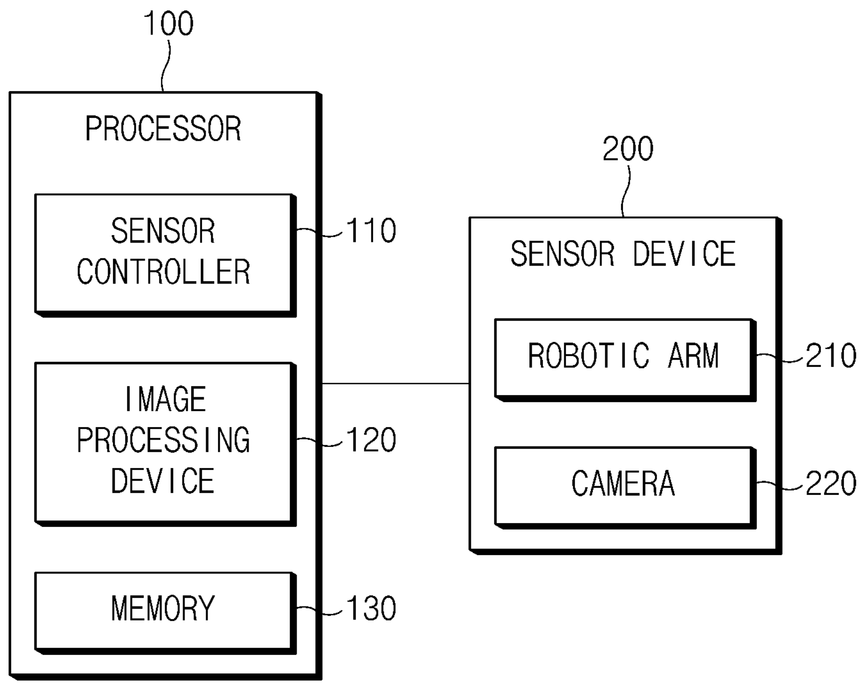
FIG. 1 is a block diagram illustrating a configuration of an apparatus for inspecting an assembly hole of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 13.

FIG. 1 is a block diagram illustrating a configuration of an apparatus for inspecting an assembly hole of a vehicle according to an exemplary embodiment of the present disclosure.

Referring to FIG. 1, the apparatus for inspecting the assembly hole of the vehicle according to an exemplary embodiment of the present disclosure may comprise a processor 100 and a sensor device 200.

The processor 100 may be configured to control the sensor device 200 and may be configured to determine whether the assembly hole of the vehicle is defective based on an image provided from the sensor device 200. To this end, the processor 100 may comprise a sensor controller 110, an image processing device 120, and a memory 130.

The sensor controller 110 may be configured to control the sensor device 200, which may be configured to control movement of a robotic arm 210 and an operation of a camera 220.

The image processing device 120 may be configured to detect an assembly hole of a vehicle body based on the image provided from the camera 220. The image processing device 120 may be configured to determine whether a part-fastening area in which the assembly hole is formed is defective, based on the shape of the assembly hole of the vehicle body.

The image processing device 120 may be configured to detect an assembly hole in the image based on artificial intelligence (AI) and may be configured to determine whether the assembly hole is defective.

To this end, the memory 130 may be configured to store the image provided from the sensor device 200 and may comprise an AI model for performing AI learning of the image. The AI model may be configured to learn a neural network using a previously stored program. The neural network for learning the image may comprise a plurality of network nodes having weights, which may be designed to simulate a human brain structure on the computer and may be configured to simulate neurons of the human neural network. The plurality of network nodes may be configured to transmit and receive data depending on each connection relationship to simulate the synaptic activity of neurons which transmit and receive signals through the synapse. The neural network may comprise a deep learning model developed from a neural network model. The plurality of network nodes in the deep learning model may be located on different layers to transmit and receive data depending on a convolution connection relationship. An example of the deep learning model may comprise various deep learning techniques such as deep neural networks (DNN), convolutional deep neural networks (CNN), a recurrent Boltzmann machine (RNN), a restricted Boltzmann machine (RBM), deep belief networks (DBN), and a deep Q-network.

The memory 130 may be configured in a combination of a non-volatile memory, such as a hard disk driver, a flash memory, an electrically erasable programmable read-only memory (EEPROM), a ferro-electric random access memory (FRAM), a phase-change RAM (PRAM), or a magnetic RAM (MRAM), and/or a volatile memory, such as a static RAM (SRAM), a dynamic RAM (DRAM), a synchronous DRAM (SDRAM), or a double date rate-SDRAM (DDR-SDRAM).

The sensor device 200 may be configured to obtain an image of an area in which the assembly hole is formed by means of the camera 220 coupled to the robotic arm 210.

The robotic arm 210 may be configured to be controlled based on a robot off-line teaching program (OLP). To this end, before the robotic arm 210 moves to a place where the assembly hole is inspected, a virtual process may be constructed.

For the inspection efficiency of the assembly hole of the vehicle body, two or more robotic arms 210 may be arranged to inspect one vehicle body. For example, the vehicle body may be divided into a front inspection area and a rear inspection area or may be divided into a left inspection area and a right inspection area. The one robotic arm 210 may be configured to be in charge of one inspection area.

The robot OLP may comprise programming, installing a robot, calibration, downloading the robot OLP, identifying an interlock waiting time, and capturing an image using the robot.

The programming process may comprise a procedure for generating a code for movement of the robotic arm 210, an image capture position, and an operation of the camera 220 in robot simulation software.

The robot installation process may comprise a procedure for installing the robotic arm 210 in a place where the process of inspecting the assembly hole of the vehicle body is performed.

The calibration process may comprise a procedure for calibrating a position of the robot by means of actual measurement in the place where the robotic arm 210 is installed.

The process of downloading the robot OLP may comprise a procedure for loading the OLP in which the calibration is completed into the robotic arm 210.

The process of identifying the interlock waiting time may comprise a procedure for checking the entire interlock waiting time of the robotic arm 210.

The camera 220 may be configured to obtain a 2D or 3D image and may be configured to obtain a monochromatic black and white image or a color image including RGB three primary colors.

Figure 2:
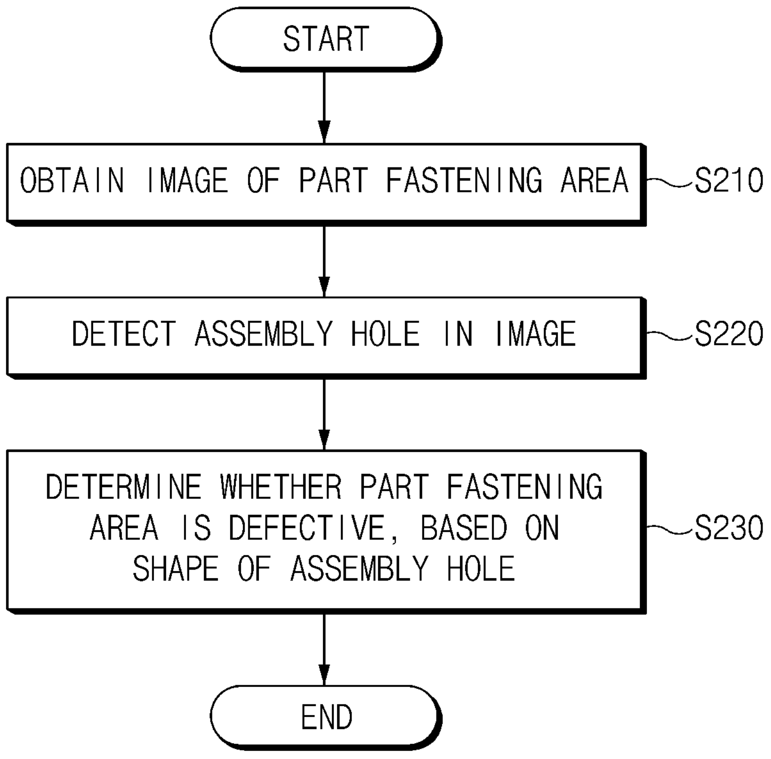
FIG. 2 is a flowchart illustrating a method for inspecting an assembly hole of a vehicle according to an exemplary embodiment of the present disclosure.

FIG. 2 is a flowchart illustrating a method for inspecting an assembly hole of a vehicle according to an exemplary embodiment of the present disclosure.

The method for inspecting the assembly hole of the vehicle according to an exemplary embodiment of the present disclosure will be described with reference to FIG. 2.

In S210, a camera 220 of FIG. 1 may be configured to obtain an image of a part-fastening area.

Figure 3:
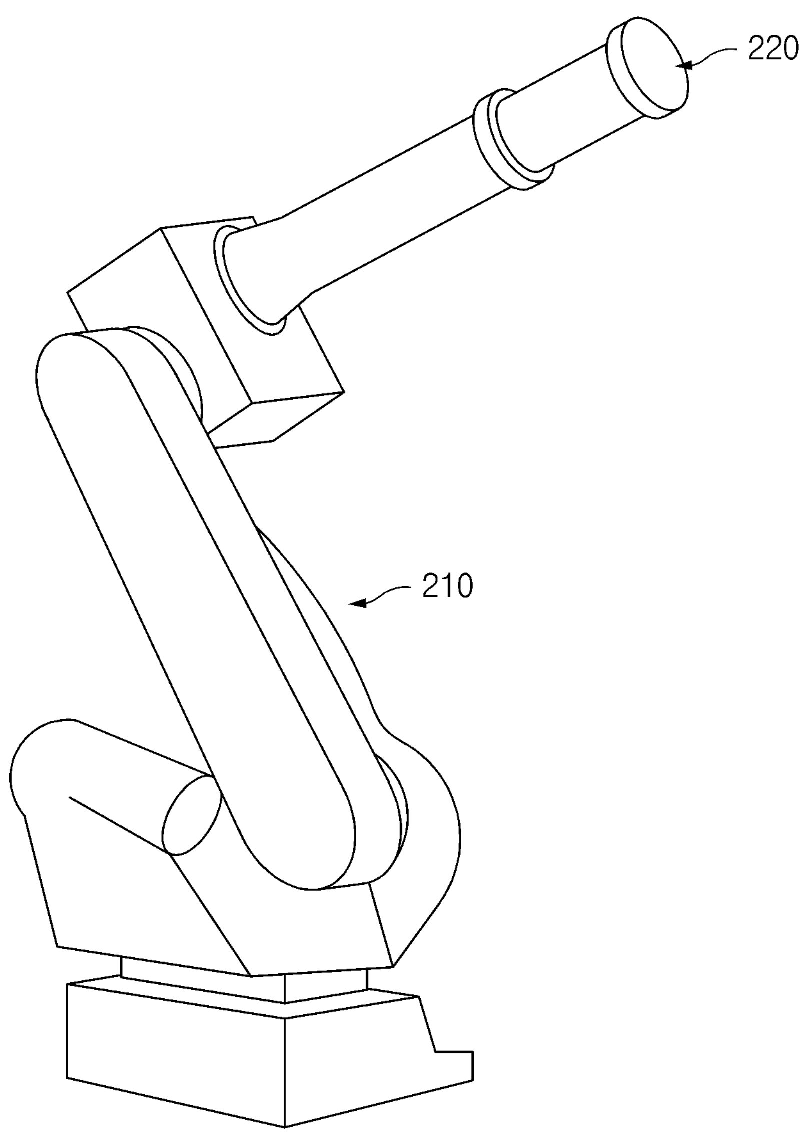
FIG. 3 is a drawing illustrating an exemplary embodiment of a robotic arm on which a camera is mounted.

FIG. 3 is a drawing illustrating an exemplary embodiment of a robotic arm on which a camera is mounted.

Referring to FIG. 3, a camera 220 of FIG. 1 may be coupled to one end of a robotic arm 210 of FIG. 1, and the robotic arm 210 may be configured to move under control of a processor 100 of FIG. 1.

The procedure of obtaining the image of the part-fastening area may proceed after the welding process in the body assembly process is completed. After the body welding assembly process is completed, the processor 100 may be configured to move the robotic arm 210 to a part-fastening area. The processor 100 may be configured to move the robotic arm 210 based on off-line programming.

The part-fastening area may be a predetermined area. For example, the part-fastening area may be an area where a hole for mounting a chassis is formed, an area where a hole for assembling a front glass is formed, or an area where a hole for mounting a rear quarter glass is formed.

After controlling the position of the robotic arm 210, the processor 100 may be configured to control the camera 220 to obtain an image of the part-fastening area. The image the processor 100 receives from the camera 220 may be a monochromatic image and may be a color image including RGB three primary colors. Furthermore, the image of the part-fastening area may refer to pieces of pixel data of a panel.

In S220, the processor 100 may be configured to detect an assembly hole in the image obtained by the camera 220.

To this end, the processor 100 may be configured to perform AI learning of the image of the part-fastening area and may be configured to extract a class indicating the assembly hole depending on the learned result.

According to an exemplary embodiment, the processor 100 may be configured to proceed with image learning using a fully convolutional network (FCN) model.

The FCN model may be obtained by transforming a convolutional neural networks (CNN) model for image classification, which may be for a semantic segmentation task.

The image classification may be accomplished in a structure where features are extracted from all pixels in the image, the extracted features are input to a classifier, and a class of the total input image is predicted. A general image classification model may comprise a fully connected layer (FCL) in a last layer of the network.

The FCN may comprise position information by replacing last FCLs with convolution layers.

The processor 100 may be configured to preset a target assembly hole depending on the part-fastening area.

For example, when the hole for mounting the chassis is a circle, the processor 100 may be configured to determine a circular class as an assembly hole in an image of a chassis mounting area. Alternatively, when the hole for assembling the front glass is a square, the processor 100 may be configured to determine a square class as an assembly hole in an image of a front glass assembling area. Alternatively, when the hole for mounting the rear quarter glass is in the form of a notch, the processor 100 may be configured to determine a class in the form of the notch as an assembly hole in an image of a rear quarter glass mounting area.

In S230, the processor 100 may be configured to perform AI learning of the shape of the assembly hole detected in the image and may be configured to determine whether the part-fastening area is defective.

Figure 4A:
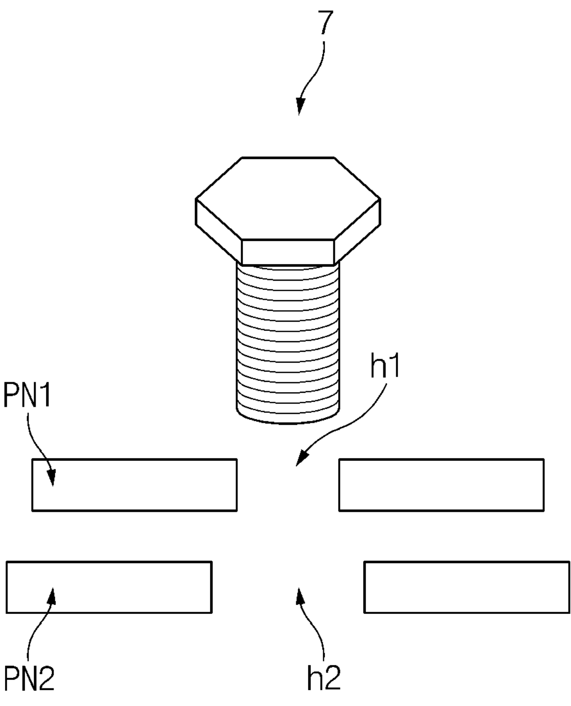
FIGS. 4A and 4B are drawings describing a method for determining whether a part-fastening area in which an assembly hole is formed is defective.
Figure 4B:
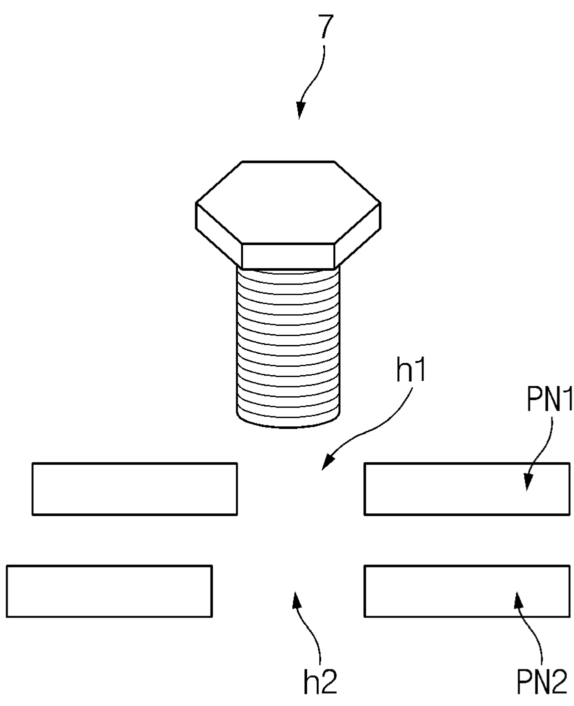

FIGS. 4A and 4B are drawings describing a method for determining whether a part-fastening area in which an assembly hole is formed is defective.

Referring to FIGS. 4A and 4B, a processor 100 of FIG. 1 may be configured to detect an area in which a first hole h1 and a second h2 overlap with each other. The first hole h1 may be a hole formed in a first panel PN1, and the second hole h2 may be a hole formed in a second panel PN2. The first panel PN1 and the second panel PN2 may be panels making up a vehicle body and may be variously divided according to an exemplary embodiment. The first hole h1 and the second hole h2 may be formed to couple a vehicle accessory device or the like to the vehicle body.

As shown in FIG. 4A, when the area where the first hole h1 and the second hole 2 overlap with each other has a size where a fastener 7 is able to be penetrated, the processor 100 may be configured to determine that the part-fastening area is normal.

As shown in FIG. 4B, when the area where the first hole h1 and the second hole 2 overlap with each other has a size where the fastener 7 is not penetrated, the processor 100 may be configured to determine that the part-fastening area is defective.

Hereinafter, a description will be given in detail of an exemplary embodiment in which the processor 100 detects an assembly hole and determines whether the part-fastening area is defective based on the shape of the detected assembly hole.

Figure 5:
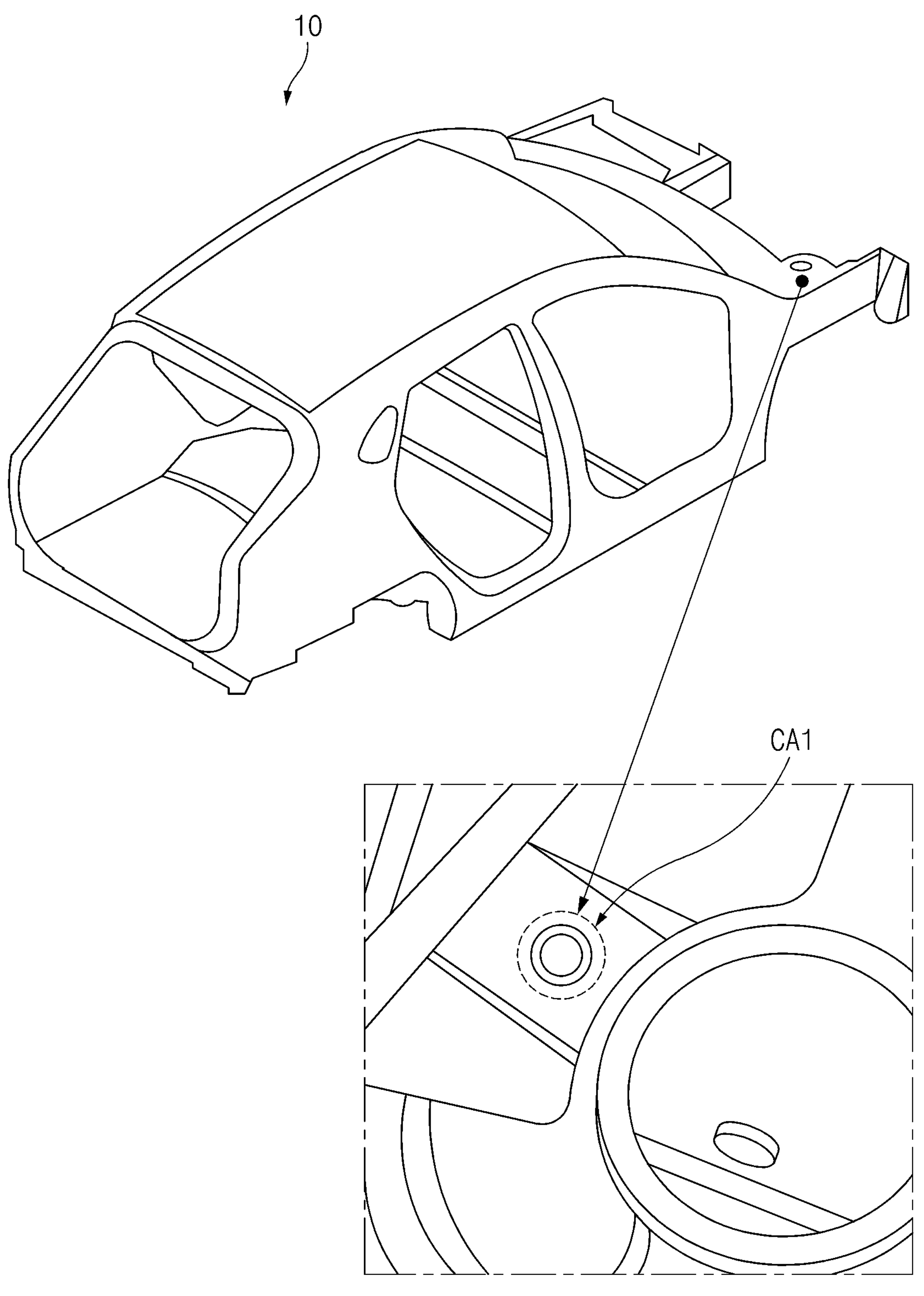
FIG. 5 is a drawing illustrating a part-fastening area in which a circular hole is formed.
Figure 6:
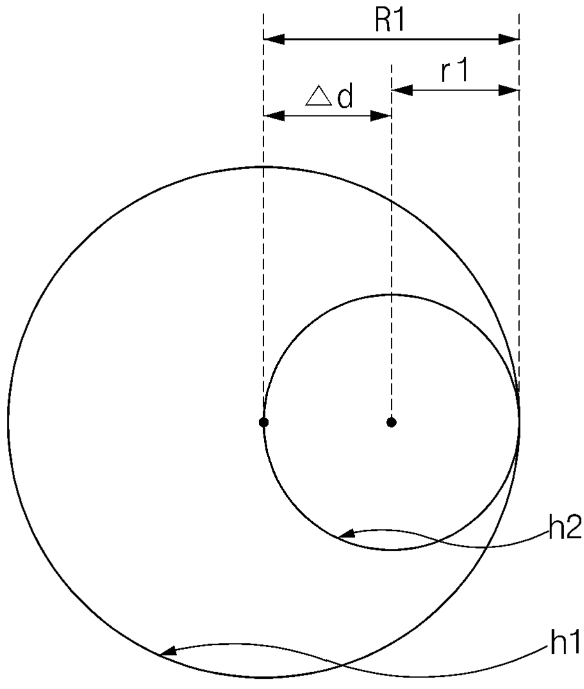
FIG. 6 is a drawing illustrating an image of a part-fastening area which is in a normal state.
Figure 7:
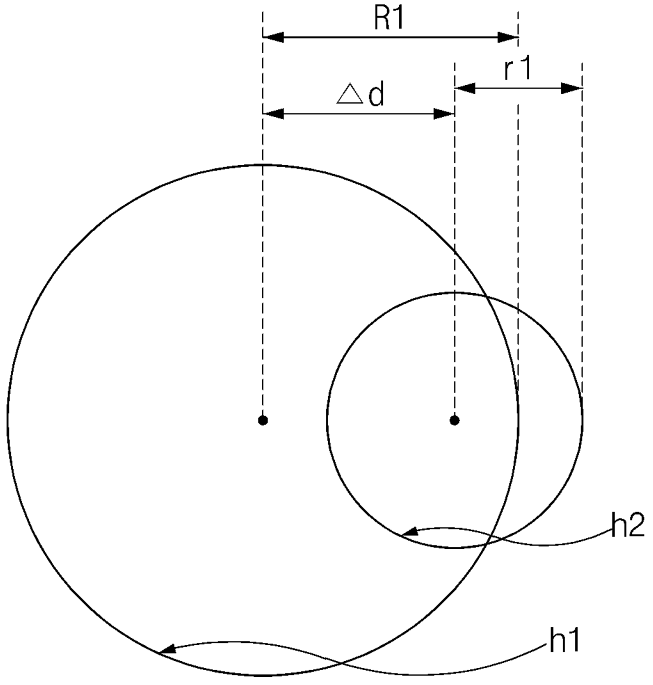
FIG. 7 is a drawing illustrating an image of a part-fastening area which is in a defective state.

FIGS. 5 to 7 are drawings describing an exemplary embodiment of determining whether a part engaging area in which a circular hole is formed is defective. FIG. 5 is a drawing illustrating a part-fastening area in which a circular hole is formed. FIG. 6 is a drawing illustrating an image of a part-fastening area which is in a normal state. FIG. 7 is a drawing illustrating an image of a part-fastening area which is in a defective state.

Referring to FIG. 5, the circular hole may be a hole for mounting a chassis.

A first hole h1 may be a hole formed in a fender apron panel, and a second hole h2 may be a hole formed in a dash panel.

Referring to FIGS. 6 and 7, each of the first hole h1 and the second hole h2 may have a circular shape, and the second hole h2 may be smaller in size than the first hole h1. The second hole h2 may be located in an area of the first hole h1, such that a fastener may penetrate the first hole h1 and the second hole h2. Thus, a processor 100 of FIG. 1 may be configured to determine a position relationship between the second hole h2 and the first hole h1 to determine whether the circular hole is defective.

When the circular first hole h1 and the circular second hole h2 are detected, the processor 100 may be configured to determine a radius R1 of the first hole h1 and a radius r1 of the second hole h2.

The processor 100 may be configured to determine a distance Δd between the center of the first hole h1 and the center of the second hole h2.

Furthermore, the processor 100 may be configured to calculate a difference (R1−r1) between the radius R1 of the first hole h1 and the radius r1 of the second hole h2.

The processor 100 may be configured to compare the distance Δd between the center of the first hole h1 and the center of the second hole h2 with the difference (R1−r1) between the radius R1 of the first hole h1 and the radius r1 of the second hole h2.

As shown in FIG. 6, when the distance Δd between the center of the first hole h1 and the center of the second hole h2 is less than the difference (R1−r1) between the radius R1 of the first hole h1 and the radius r1 of the second hole h2, the processor 100 may be configured to determine that the circular hole is in a normal state. In other words, when (R1−r1)<Δd, the processor 100 may be configured to determine that the circular hole is in the normal state.

Alternatively, as shown in FIG. 7, when the distance Δd between the center of the first hole h1 and the center of the second hole h2 is greater than the difference (R1−r1) between the radius R1 of the first hole h1 and the radius r1 of the second hole h2, the processor 100 may be configured to determine that the circular hole is in a defective state. In other words, when (R1−r1)>Δd, the processor 100 may be configured to determine that the circular hole is in the defective state.

Figure 8:
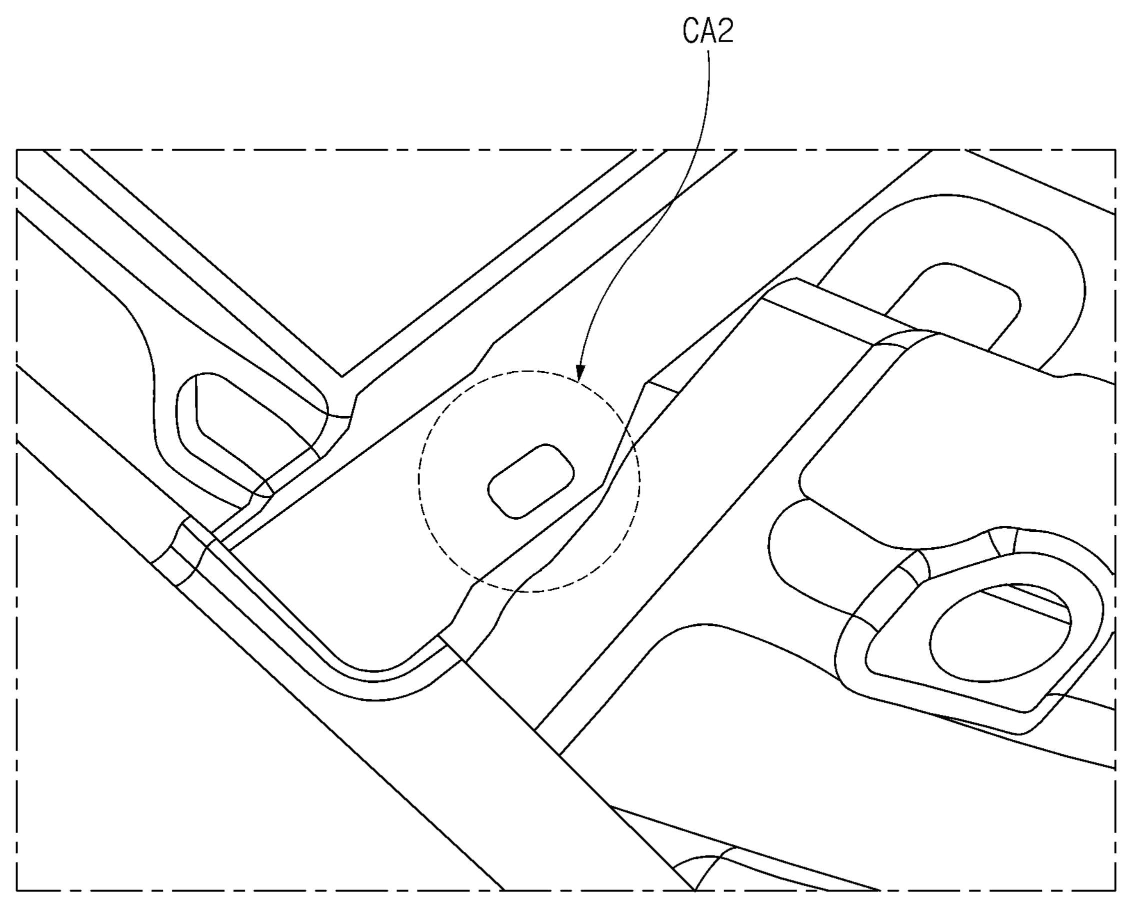
FIG. 8 is a drawing illustrating a part-fastening area in which a square hole is formed.
Figure 9:
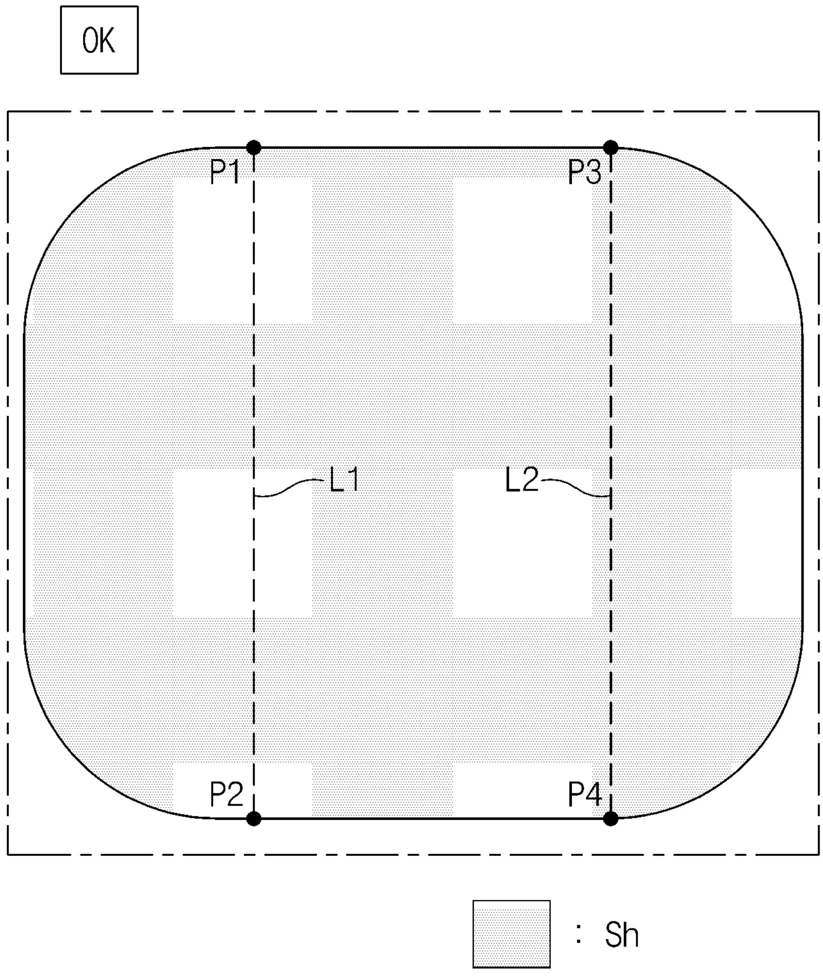
FIG. 9 is a drawing illustrating an image of a part-fastening area which is in a normal state.
Figure 10:
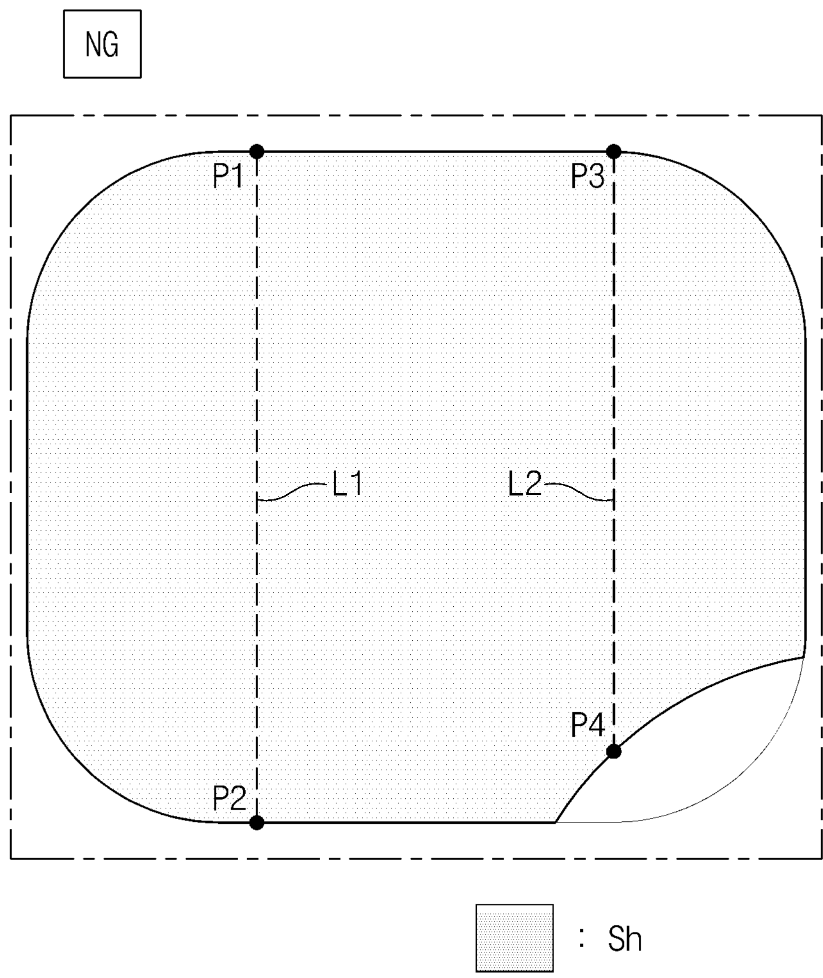
FIG. 10 is a drawing illustrating an image of a part-fastening area which is in a defective state.

FIGS. 8 to 10 are drawings describing an exemplary embodiment of determining whether a part-fastening area in which a square hole is formed is defective. FIG. 8 is a drawing illustrating a part-fastening area in which a square hole is formed. FIG. 9 is a drawing illustrating an image of a part-fastening area which is in a normal state. FIG. 10 is a drawing illustrating an image of a part-fastening area which is in a defective state.

Referring to FIG. 8, the square hole may be a hole for mounting a chassis.

A first hole may be a hole formed in a roof rail, and a second hole may be a hole formed in a roof panel. The first hole or the second hole may be a square, and both the first hole and the second hole may be formed in the form of a square.

When at least one of the first hole or the second hole has the square, a processor 100 of FIG. 1 may be configured to detect any reference line connecting both sides facing each other in the square hole. The processor 100 may be configured to determine that a part-fastening area CA2 is defective based on that the length of the reference line is less than a threshold length.

To this end, as shown in FIGS. 9 and 10, the processor 100 may be configured to select any two or more segments, each of which connects both sides facing each other in a square hole Sh. For example, any segment may comprise a first segment L1 connecting a first reference point P1 with a second reference point P2 and a second segment L2 connecting a third reference point P3 with a fourth reference point P4. The first segment L1 and the second segment L2 may be positions which are parallel to each other.

The processor 100 may be configured to determine a segment with a short length between the first segment L1 and the second segment L2 as a reference line.

The processor 100 may be configured to compare the length of the reference line with the threshold distance to determine that the part-fastening area CA2 is defective based on that the length of the reference line is less than the threshold length. The threshold length may be preset within a range where a fastener may be penetrated.

As shown in FIG. 9, when the square hole Sh is hidden, the first segment L1 and the second segment L2 may be the same in length as each other. The processor 100 may be configured to determine any of the first segment L1 and the second segment L2 as a reference line.

Because the square hole Sh has a size where a fastener is able to be penetrated, both the first segment L1 and the second segment L2 may be greater than or equal to the threshold length. Thus, because the reference line is greater than or equal to the threshold length, the processor 100 may be configured to determine that the part-fastening area CA2 is normal.

As shown in FIG. 10, when the square hole Sh is hidden, the second segment L2 located in the hidden area may have a length shorter than the first segment L1. Thus, the processor 100 may be configured to determine the second segment L2 as the reference line.

The processor 100 may be configured to compare the length of the second segment L2 with the threshold distance to determine that the part-fastening area CA2 is defective based on that the length of the second reference line is less than the threshold length.

Figure 11:
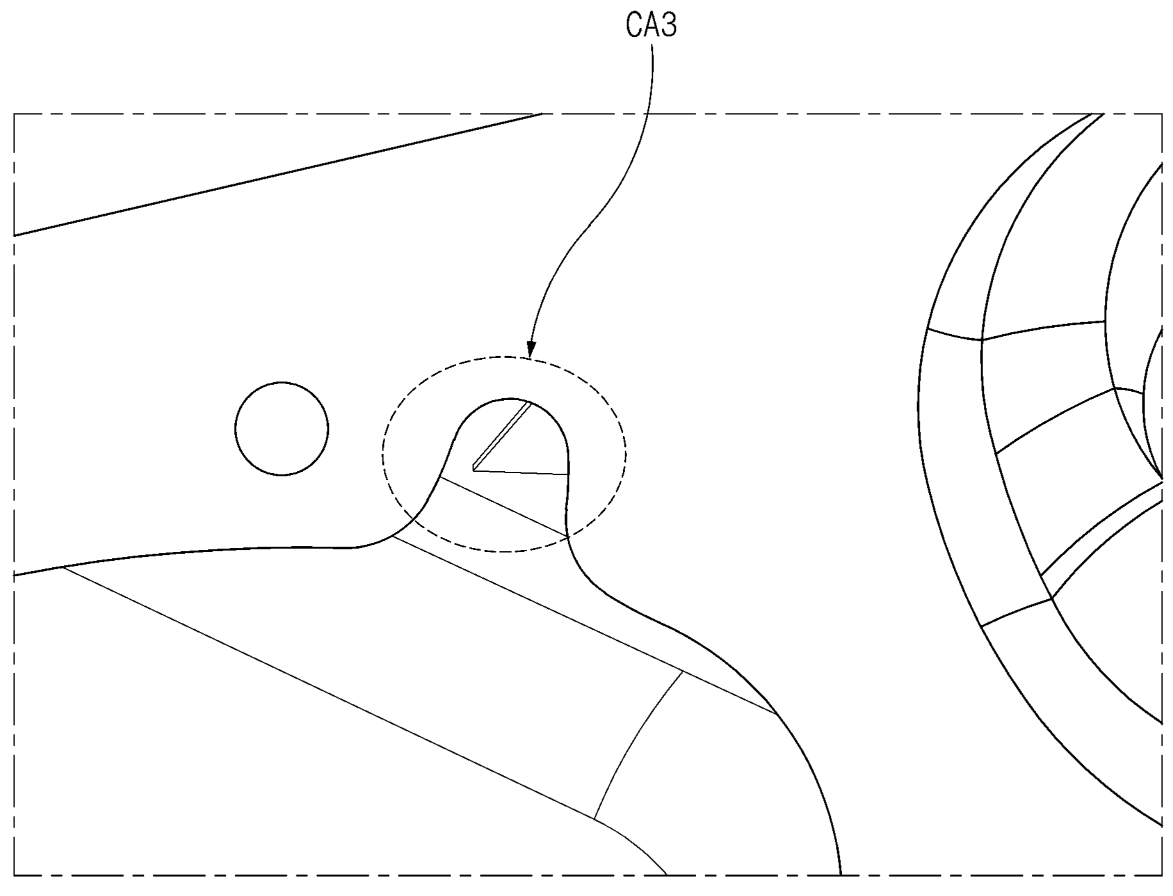
FIG. 11 is a drawing illustrating a part-fastening area in which a notch hole is formed.
Figure 12:
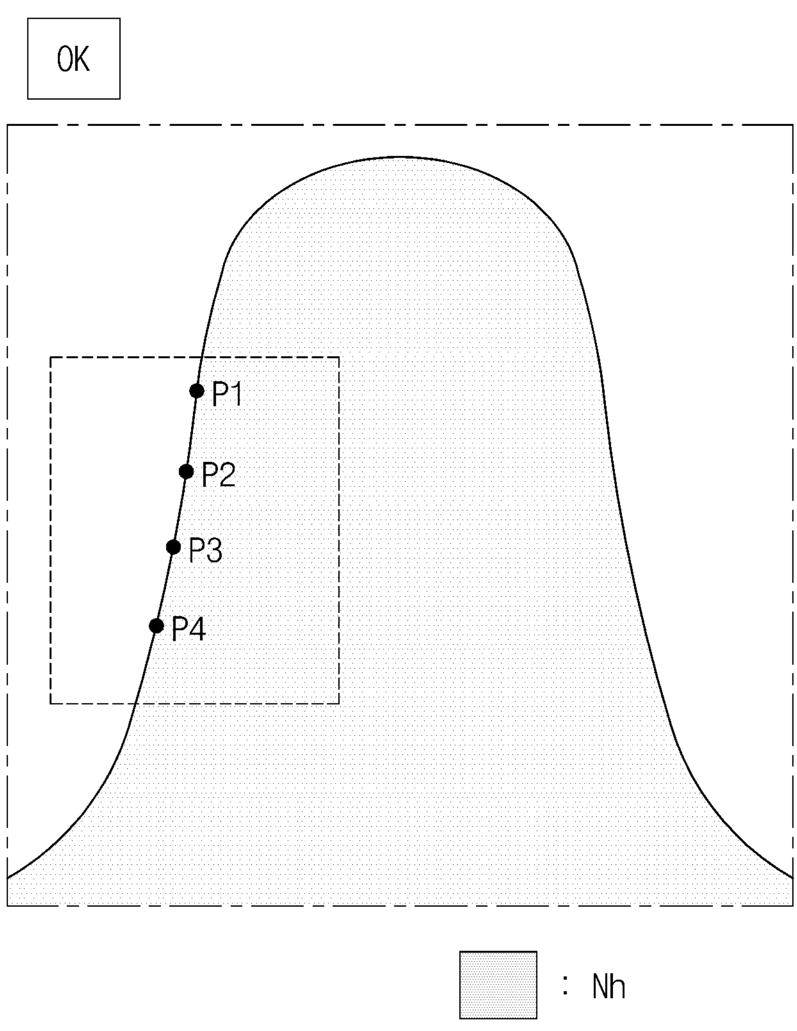
FIG. 12 is a drawing illustrating an image of a part-fastening area which is in a normal state.
Figure 13:
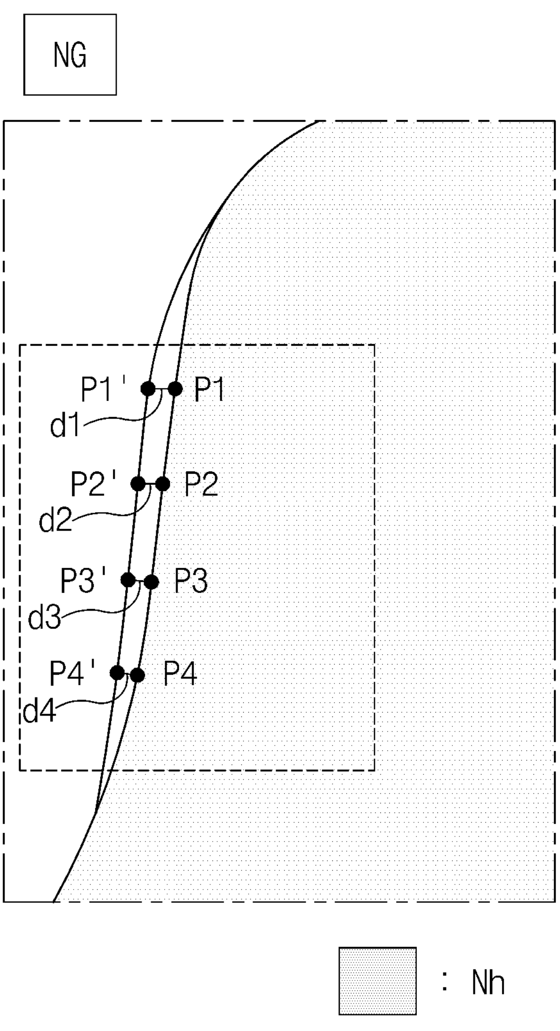
FIG. 13 is a drawing illustrating an image of a part-fastening area which is in a defective state.

FIGS. 11 to 13 are drawings describing an exemplary embodiment of determining whether a part-fastening area in which a notch hole is formed is defective. FIG. 11 is a drawing illustrating a part-fastening area in which a notch hole is formed. FIG. 12 is a drawing illustrating an image of a part-fastening area which is in a normal state. FIG. 13 is a drawing illustrating an image of a part-fastening area which is in a defective state.

Referring to FIG. 11, the notch hole may be a hole for mounting a chassis.

A first hole may be a hole formed in a quarter panel, and a second hole may be a hole formed in a side outer panel. The first hole or the second hole may be the notch hole, and both the first hole and the second hole may be formed of the notch hole. Hereinafter, a description will be given of the case where the notch hole is a hole formed in a first panel.

A processor 100 of FIG. 1 may be configured to determine that a part-fastening area is defective, based on that a gap where the notch hole Nh and the panel do not overlap with each other is greater than or equal to a predetermined threshold. The panel in which the gap is formed may refer to another panel except for a panel in which the notch hole Nh is formed. For example, when the notch hole Nh is formed in the first panel, the panel in which the gap is formed may be a second panel.

As shown in FIGS. 12 and 13, to determine a gap in which the notch hole Nh and the panel do not overlap with each other, the processor 100 may be configured to select any reference point of a boundary area of the notch hole Nh in the image. For example, as shown in FIGS. 12 and 13, the processor 100 may be configured to select first to fourth reference points P1 to P4. The processor 100 may be configured to determine whether the image of the outside of the notch hole Nh adjacent to the first to fourth reference points P1 to P4 is any of the first pane or the second panel.

When there is no portion where the notch hole Nh is hidden by the panel, as shown in FIG. 12, an area adjacent to the notch hole Nh may correspond to an image of the first panel in which the notch hole Nh is formed. Thus, when there is no portion in which the notch hole Nh is hidden by the panel, a gap may fail to be formed. The processor 100 may be configured to determine that the part-fastening area is normal, based on that the gap is not formed or when the size of the gap is less than a threshold.

As shown in FIG. 13, when the notch hole Nh is hidden by another panel, an image of another panel in which the notch hole Nh is not formed in an area adjacent to the notch hole Nh may be indicated. Thus, a gap may be formed in the outside of the notch hole Nh.

To determine the size of the gap, the processor 100 may be configured to determine a distance between reference points P1, P2, P3, and P4 and virtual reference points P1', P2', P3', and P4' formed in the outside of the gap. For example, the first virtual reference point P1' may be a point overlapped with a straight line horizontally extending from the first reference point P1 in the outside of the gap. In other words, the processor 100 may be configured to calculate a first distance d1 between the first reference point P1 and the first virtual reference point P1'. Similarly, the processor 100 may be configured to calculate a second distance d2 between the second reference point P2 and the second virtual reference point P2', may be configured to calculate a third distance d3 between the third reference point P3 and the third virtual reference point P3', and may be configured to calculate a fourth distance d4 between the fourth reference point P4 and the fourth virtual reference point P4'.

The processor 100 may be configured to determine that the part-fastening area is defective, based on that one of the first distance d1, the second distance d2, the third distance d3, or the fourth distance d4 is greater than or equal to a predetermined threshold.

In the above embodiment, the number of reference points is set to any number. For example, one reference point may be used.

The apparatus and the method for inspecting the assembly hole of the vehicle according to an exemplary embodiment of the present disclosure may considerably reduce an inspection time by determining whether the assembly hole is defective by means of vision inspection.

The apparatus and the method for inspecting the assembly hole of the vehicle according to an exemplary embodiment of the present disclosure may inspect the assembly hole for all vehicle bodies while reducing an inspection time by controlling the camera based on the robot off-line teaching program (OLP).

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for inspecting an assembly hole of a vehicle, the apparatus comprising:
- a sensor device configured to obtain an image of a part-fastening area; and
- a processor configured to:
  - detect an assembly hole of a vehicle body in the image; and
  - perform artificial intelligence (AI) learning of a shape of the assembly hole to determine whether the part-fastening area is defective;
- wherein the processor is further configured to:
  - detect an overlap area where a first hole formed in a first panel of the part-fastening area and a second hole formed in a second panel of the part-fastening area overlap with each other;
  - determine whether the first hole or the second hole corresponds to a circular hole used to mount a chassis; and
  - determine that the part-fastening area is defective when the area where the first hole and the second hole overlap with each other is greater than or equal to a threshold size.

2. The apparatus of claim 1, wherein the sensor device comprises:
- a robotic arm configured to move based on a robot off-line teaching program (OLP); and
- a camera coupled to the robotic arm, the camera being configured to obtain the image.

3. An apparatus for inspecting an assembly hole of a vehicle, the apparatus comprising:
- a sensor device configured to obtain an image of a part-fastening area; and
- a processor configured to:
  - detect an assembly hole of a vehicle body in the image; and
  - perform artificial intelligence (AI) learning of a shape of the assembly hole to determine whether the part-fastening area is defective;
- wherein the processor is further configured to;
  - detect an overlap area where a first hole formed in a first panel of the part-fastening area and a second hole formed in a second panel of the part-fastening area overlap with each other;
  - determine whether the first hole or the second hole is a square hole used to assemble a front glass; and
  - determine that the part-fastening area is defective when a length of any segment connecting both sides facing each other in the square hole is less than a predetermined threshold length.

4. An apparatus for inspecting an assembly hole of a vehicle, the apparatus comprising:
- a sensor device configured to obtain an image of a part-fastening area; and
- a processor configured to:
  - detect an assembly hole of a vehicle body in the image; and
  - perform artificial intelligence (AI) learning of a shape of the assembly hole to determine whether the part-fastening area is defective;
- wherein the processor is further configured to:
  - detect an overlap area where a first hole formed in a first panel of the part-fastening area and a second hole formed in a second panel of the part-fastening area overlap with each other;

determine whether the first hole or the second hole is a notch hole used to mount a rear quarter glass, and determine that the part-fastening area is defective when a gap where the notch hole and another panel in which the notch hole is not formed overlap with each other is greater than or equal to a predetermined threshold.

5. A method for inspecting an assembly hole of a vehicle, the method comprising:

obtaining an image of a part-fastening area;

detecting an overlap area where a first hole formed in a first panel of the part-fastening area and a second hole formed in a second panel of the part-fastening area overlap with each other in the image;

determining whether the first hole of the second hole is a circular hole; and performing artificial intelligence (AI) learning of a shape of the assembly hole; and determining that the part-fastening area is defective when the area where the first hole and the second hole overlap with each other is greater than or equal to a threshold size.

6. The method of claim 5, wherein the obtaining the image of the part-fastening area comprises controlling a position of a camera obtaining the image using a robot off-line teaching program (OLP).

7. A method for inspecting an assembly hole of a vehicle, the method comprising:

obtaining an image of a part-fastening area;

detecting an overlap area where a first hole formed in a first panel of the part-fastening area and a second hole formed in a second panel of the part-fastening area overlap with each other in the image;

determining whether the first hole or the second hole is a square hole used to assemble a front glass;

performing artificial intelligence (AI) learning of a shape of the assembly hole; and determining that the part-fastening area is defective when a length of any segment connecting both sides facing each other in the square hole is less than a predetermined threshold length.

8. A method for inspecting an assembly hole of a vehicle, the method comprising:

obtaining an image of a part-fastening area;

detecting an overlap area where a first hole formed in a first panel of the part-fastening area and a second hole formed in a second panel of the part-fastening area overlap with each other in the image;

determining whether the first hole or the second hole is a notch hole; and determining that the part-fastening area is defective when a gap where the notch hole and another panel in which the notch hole is not formed overlap with each other is greater than or equal to a predetermined threshold.

* * * * *